June 2, 1925.
J. W. FURMAN
PLANTING MACHINE
Filed May 25, 1922.
1,540,210
2 Sheets-Sheet 1
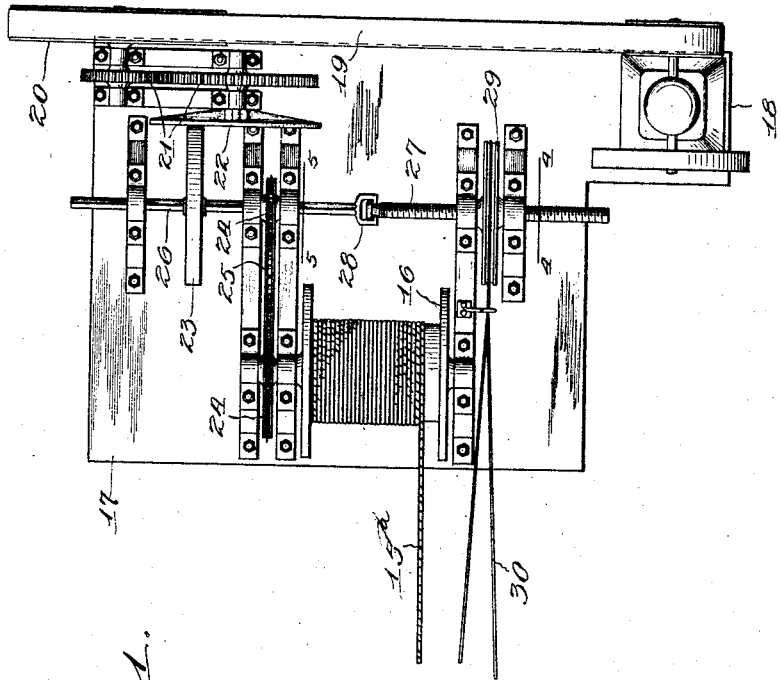
Fig. 1.
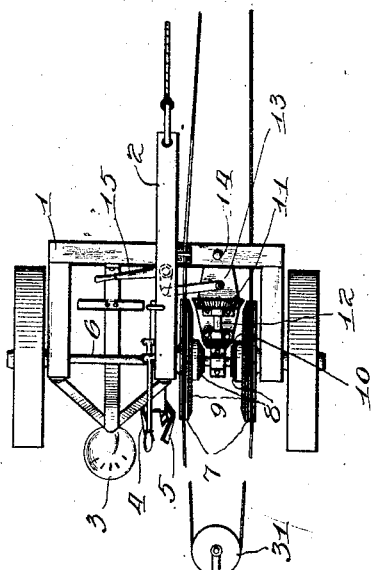
Inventor
John W. Furman
By C. W. Clement
Attorney June 2, 1925.  
J. W. FURMAN  
PLANTING MACHINE  
Filed May 25, 1922

Inventor
John W. Furman
By C. W. Clement
Attorney

Patented June 2, 1925.

1,540,210

UNITED STATES PATENT OFFICE.

JOHN W. FURMAN, OF POINT TOWNSHIP, NORTHUMBERLAND COUNTY, PENNSYLVANIA.

PLANTING MACHINE.

Application filed May 25, 1922. Serial No. 563,567.

*To all whom it may concern:*

Be it known that I, JOHN W. FURMAN, a citizen of the United States, residing in Point Township, in the county of Northumberland and State of Pennsylvania, have invented certain new and useful Improvements in Planting Machines, of which the following is a specification.

This invention relates to improvements in planting machines, and has for its object a more efficient, economical, and quicker means of placing plants in the ground than can be accomplished by hand, and also enables the operator to place them closer together than can be done by a horse operated machine.

The various features of the invention will be more fully described in connection with the accompanying drawing in which:—

Figure 1 is a top plan view of the device when in use.

Figure 2:
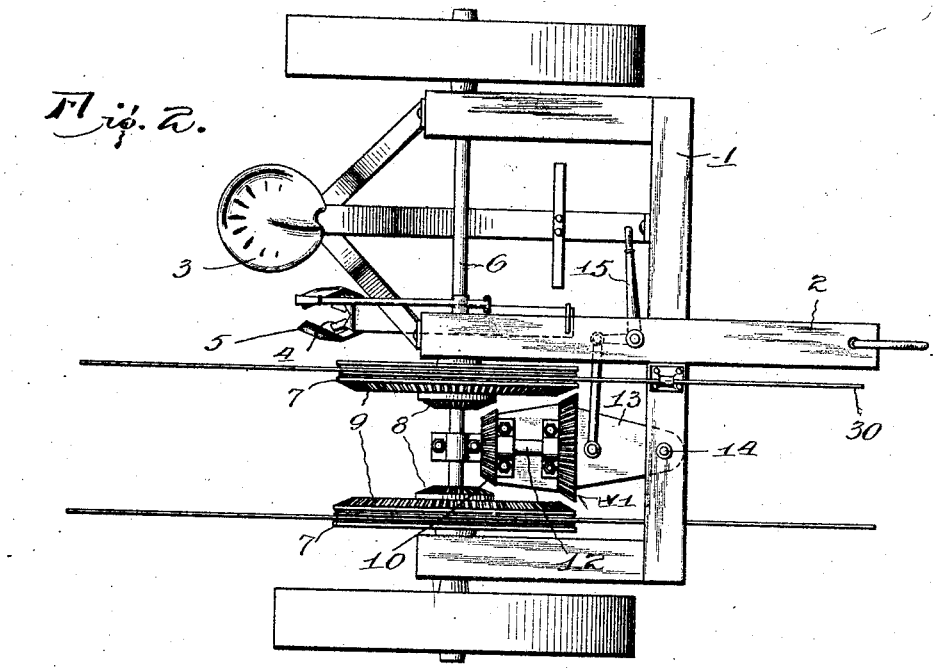
Figure 2 is a top plan view of the planting machine proper.
Figure 3:
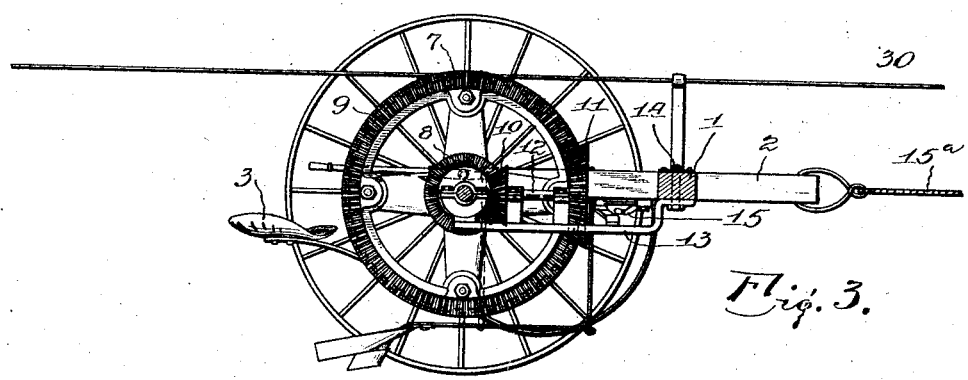
Figure 3 is a sectional view of the same.
Figure 4:
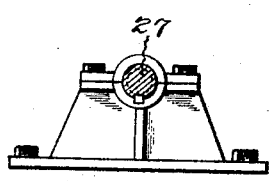

Figure 4 indicates a sectional view of the bearings of the square shaft on which friction gear is mounted.

Figure 5:
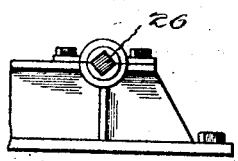

Figure 5 indicates a sectional view of the bearing of the threaded shaft.

Referring to the drawing, 1 indicates a wheeled truck with the usual tongue 2, the truck being provided with a seat 3, furrow opening plow 4 and furrow closing device 5. Mounted on the axle 6 of the truck are sheave wheels 7, on the interior faces of which are bevel gears 8 and 9. Bevel gears 10 and 11 are mounted on a shaft 12 which is fixed on a bed 13 pivotally secured to the frame of the truck at 14, said gearing being adapted to mesh with gearing 8 and 9 when said bed is moved either to the right or the left by means of lever 15.

A rope or cable 15ª is connected to the tongue 2 of the wheeled truck at one end and also passes around a drum 16 on the platform 17. The said drum 16 is operated by a motor 18 through the medium of belt 19, pulley 20, gears 21, friction disc 22, friction gear 23, sprockets 24 and chain 25. The friction wheel 23 is fixed on a square shaft 26 which has a square bearing surrounded by a circular bearing (Fig. 5) which permits of lateral movement and enables the friction wheel 23 to engage the friction disc 22 at any point from the center to the circumference of the same. The shaft 26 is connected to a threaded shaft 27 by clutch 28, the said shaft 27 being keyed in its bearing (Fig. 4) which prevents it from turning, but permits of a lateral movement with the shaft 26. On the threaded shaft 27 is a nut which forms a bearing for the sheave 29, as by this arrangement, upon turning said sheave the threaded shaft is given a lateral movement. An endless cable 30 passes around sheave 29, sheaves 9 and fixed sheave 31 for the purpose hereinafter described.

The operation of the device is as follows:—

The wheeled truck is placed at one side of the field to be planted, the platform with the motive power on the same is placed on the other side of the field the two being connected by a rope. The operator is seated upon the truck with a supply of plants. When the said truck is drawn across the field by the mechanism on the platform, the forward plow opens the furrow into which the plants are dropped, one at a time, the rear plow pulls the earth around the plant covering the roots of the same.

The speed of the truck may be regulated by means of a lever on the same and operates as follows. When the handle of the lever moves forward, the bevel gears on the truck are thrown into mesh with the bevel gears on the sheave nearer the operater which causes the cable that passes around the same to turn the sheave on the platform which in turn moves the screw threaded shaft and square shaft to the right which in turn moves the friction wheel toward the center of the friction disc and decreases the speed of the drum. By moving the lever backward the gears on the truck are thrown into mesh with the outside sheave on the truck which causes the cable that passes around the same to move the sheave on the platform in the opposite direction to that above described and in turn causes the friction wheel to move toward the circumference of the friction disc thus increasing the speed of the drum.

What I claim as new and desire to secure by Letters Patent is:

1. A traction apparatus comprising a truck, a stationary motor, a drum, a cable connecting the drum with the truck, speed changing gearing between the motor and drum, a device for adjusting said gearing to vary the speed of the drum including a sheave, a cable extending from the truck to said sheave and back to the truck, sheaves on the truck for winding and paying off the latter cable, and gearing on the truck for connecting either of the latter sheaves in driving relation with the truck wheel.

2. A traction apparatus comprising a wheeled truck, a stationary motor, a drum, a cable connecting the drum with the truck, speed changing gearing between the motor and drum including a friction wheel and a shaft rotatable therewith, a threaded bar for moving said shaft endwise, a sheave wheel having a threaded connection with said bar for moving the bar endwise, a cable extending around said sheave and to the truck, and means on the truck for moving the latter cable to turn the sheave.

In testimony whereof I affix my signature in presence of two witnesses.

JOHN W. FURMAN.

Witnesses:
  JOHN W. BASSLER,
  C. W. CLEMENT.